(12) United States Patent
Powers et al.

(10) Patent No.: US 12,597,538 B2
(45) Date of Patent: Apr. 7, 2026

(54) INJECTED INTERNAL STRAIN RELIEF FOR ELECTRICAL CABLES

(71) Applicant: Apple Inc., Cupertino, CA (US)

(72) Inventors: Ronald G. Powers, Scotts Valley, CA (US); Robert V. Weber, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 644 days.

(21) Appl. No.: 17/813,908

(22) Filed: Jul. 20, 2022

(65) Prior Publication Data

US 2024/0029922 A1     Jan. 25, 2024

(51) Int. Cl.
H01B 13/00      (2006.01)
H02G 15/007     (2006.01)

(52) U.S. Cl.
CPC ....... H01B 13/0036 (2013.01); H02G 15/007 (2013.01)

(58) Field of Classification Search
CPC .. G02B 6/3887; G02B 6/4429; G02B 6/4434; G02B 6/44765; H01B 7/285; H01R 13/5216
See application file for complete search history.

(56) References Cited

U.S. PATENT DOCUMENTS

| | | | | |
|---|---|---|---|---|
| 4,952,012 | A | * | 8/1990 | Stamnitz ............. G02B 6/4427 |
| | | | | 385/101 |
| 5,125,062 | A | * | 6/1992 | Marlier ............... G02B 6/4416 |
| | | | | 385/101 |
| 7,146,090 | B2 | | 12/2006 | Vo et al. |
| 8,958,673 | B2 | | 2/2015 | Cline et al. |
| 10,614,930 | B2 | * | 4/2020 | Angermann ........... H01B 7/009 |
| 10,914,909 | B2 | | 2/2021 | Wentworth et al. |
| 11,112,568 | B2 | | 9/2021 | Anderson et al. |
| 11,374,343 | B2 | | 6/2022 | Price et al. |
| 11,415,758 | B2 | * | 8/2022 | Wong .................... G02B 6/3887 |
| 2014/0140662 | A1 | * | 5/2014 | McDonald ........... G02B 6/4429 |
| | | | | 385/76 |

FOREIGN PATENT DOCUMENTS

WO        2010039830 A2      4/2010

* cited by examiner

*Primary Examiner* — Vanessa Girardi
(74) *Attorney, Agent, or Firm* — BAKERHOSTETLER

(57)                ABSTRACT

This application relates to a dispensed or injected structural reinforcement or hardening element, such as an injected internal strain relief, as incorporated into electrical cables. An electrical cable includes a cable portion comprising one or more electrical conductors that are positioned within an internal volume of the cable portion. Additionally, an electrical connector component is positioned at a terminating end of the cable portion. In addition, an internal strain relief element is positioned within the internal volume of the cable portion such that the internal strain relief element at least partially surrounds one or more of the electrical conductors, wherein the internal strain relief element comprises a cured injectable fluidic substance.

20 Claims, 9 Drawing Sheets

INJECTED INTERNAL STRAIN RELIEF FOR ELECTRICAL CABLES

FIELD

The following description relates to electrical cables for electronic devices. In particular, the following description relates to structural reinforcements, such as strain relief elements, that improve the ease, exactness, and reliability of the assembly of the various constituent parts of an electrical cable. Further, such structural reinforcements strengthen high-stress areas of an electrical cable, thereby improving the durability and longevity of the cable against "wear and tear."

BACKGROUND

Electrical cables are universally used to transmit power and data to and between electronic devices. Accordingly, electrical cables provide both a physical and electrical bridge between a transmitting power or data source and a recipient electronic device that receives the power and/or data. Accordingly, electrical cables are routinely under continuous physical and material stress as a result of the frequency of use, as well as the conditions in which they are handled and used. For example, because electrical cables provide an actual physical linkage between two components, an electrical cable may be under tension as a result of the physical distance that it must cross between the two components. For example, the physical distance between the components may nearly exceed the available length of the electrical cable thereby stretching the electrical cable taut. Conversely, the available length of an electrical cable may exceed the physical distance between the two components engaged by the electrical cable such that a slack occurs in one or more areas of the electrical cable. As a result, the electrical cable droops downward in a hammock-like manner due to the weight of the electrical cable and the gravitational force, thereby tensioning and tugging at the one or more points of physical and electrical connection between the electrical cable and the interconnected components (e.g., a remote power or data source, or an electronic device) that are present at the two juxtaposed terminating ends of the electrical cable.

As mentioned above, an electrical cable provides, in essence, an electrical highway connecting an electronic device to a remote power or data source, or to one or more separate electronic devices, wherein power and/or data is transmitted or exchanged therebetween. Accordingly, assembled at each terminating end of an electrical cable is an electrical connector component (e.g., a pronged plug, a USB connector, etc.), wherein the electrical connector component operates to matingly connect the electrical cable to an electrical receptacle (e.g., an outlet, a port, etc.) of the remote power or data source or the electronic device. Thus, at the terminating ends of an electrical cable, any individual power and/or data conductors contained within an interior of the electrical cable are electrically and physically connected or wired to corresponding conductors (e.g., electrical traces) within the electrical connector component in order for the electrical connector component to channel or relay the power and/or data being transmitted over the electrical cable to and/or from the remote power or data source or the electronic device to which it is connected. Therefore, to ensure the operability of the electrical cable, it is critically important to maintain the physical and electrical integrity of the interconnections that are present within the electrical connector component. However, the terminating ends of the electrical cable, particularly where the connections are made to the electrical connector component during the assembly of the electrical cable, may constitute relatively weak regions of the electrical cable. This is due, for example, to the fact that at the terminating ends of the electrical cable, the one or more power or data conductors within the electrical cable are necessarily disrupted at the terminating ends of the electrical cable during assembly in order to create the interconnections with the electronic connector component. Accordingly, the structural and electrical integrity of the electrical cable may be naturally compromised at the electrical cable's terminating ends as a result of, during assembly, the necessary breakage, cutoff, or discontinuation of the power and/or data conductors within the electrical cable and the subsequent linkage to the corresponding electrical conductors in the electrical connector component.

Additionally, due to the fact that, during operation, a user will likely connect and disconnect the electrical cable to and from a remote power or data source, and/or an electronic device, through the direct or indirect handling of the electrical connector components that are present at the terminating ends of the electrical cable, a substantial amount of physical pressure and stress is placed upon the structural and electrical junction between the power and/or data conductors of the electrical cable and the electrical connector components. Furthermore, any jostling or yanking of the electrical cable that might occur while the electrical cable is in use imposes additional strain at the point(s) of connection.

Therefore, there exists a variety of structural mechanisms for mechanically and materially strengthening, hardening, or reinforcing certain areas, regions, or portions of an electrical cable to improve the durability and the reliability of the electrical cable against the various forms of "wear and tear." In various examples, these structural mechanisms may be applied to the external surface of an electrical cable. Alternatively, or in addition thereto, these structural mechanisms may be applied to an interior location of the electrical cable. In many instances, these existing structural mechanisms suffer from high cost (e.g., with respect to the material(s) used). In addition, due to the fact that these structural mechanisms oftentimes constitute additional parts, manufacturing inefficiencies result from the added steps and the increased complexity during the assembly process. Furthermore, also because these structural mechanisms are, themselves, mechanical parts, they similarly degrade and fail over time as a matter of routine "wear and tear," resulting in a decline in the durability and reliability of the electrical cable.

Accordingly, there is a significant need for a hardening or reinforcing structural element that may be incorporated with an electrical cable in order to strength the several high-stress areas of the electrical cable, wherein the structural element is relatively cost-effective, relatively simple to assembly, and is highly durable. Therefore, in the following description, several exemplary embodiments of such structural mechanisms or elements are discussed and depicted in detail.

SUMMARY

This paper describes various exemplary embodiments that relate to an injected structural reinforcement or hardening element, such as an injected internal strain relief, as incorporated into electrical cables.

According to some embodiments of the present disclosure, an electrical cable is described. Specifically, the electrical cable includes a cable portion comprising one or more electrical conductors positioned within an internal volume of the cable portion. Further, a hollow tube is positioned within the internal volume of the cable portion, wherein the hollow tube is adjacent at least one of the electrical conductors. Further, an electrical connector component is positioned at a terminating end of the cable portion. In addition, an internal strain relief element is positioned within the hollow tube, wherein the internal strain relief element comprises a cured injectable fluidic substance. Additionally, the internal strain relief element is positioned within the hollow tube: (1) at the terminating end; and (2) to a pre-determined depth within the hollow tube. Furthermore, a viscosity of the injectable fluidic substance is such that, prior to its cured state and upon its injection into the hollow tube, any subsequent flow of the injectable fluidic substance does not exceed the pre-determined depth. Additionally, a viscosity of the injectable fluidic substance is such that, in its cured state, the injectable fluidic substance has a pre-determined degree of rigidity. In addition, the electrical connector component is capable of electrically coupling the electrical conductor(s) to: (1) an external power and/or data source; and/or (2) an electronic device. Further, the internal strain relief element comprises an epoxy. Also, in certain embodiments, the hollow tube comprises a plurality of hollow tubes that are positioned within the internal volume of the cable portion and the internal strain relief element is then positioned within each of the hollow tubes.

According to further exemplary embodiments of the present disclosure, there is described an electrical cable. Specifically, the electrical cable includes a cable portion that comprises an electrical conductor positioned within an internal volume of the cable portion. Furthermore, an electrical connector component is positioned at a terminating end of the cable portion. Further, an internal strain relief element is positioned within the internal volume of the cable portion such that the internal strain relief element at least partially surrounds the electrical conductor. The internal strain relief element comprises a cured injectable fluidic substance. Further, the internal strain relief element is positioned within the internal volume: (1) at the terminating end of the cable portion; and (2) to a pre-determined depth within the internal volume. In addition, a viscosity of the injectable fluidic substance is such that, prior to its cured state and upon its injection into the internal volume, any subsequent flow of the injectable fluidic substance does not exceed the pre-determined depth. Further, a viscosity of the injectable fluidic substance is such that, in its cured state, the injectable fluidic substance has a pre-determined degree of rigidity. Also, the electrical connector component is capable of electrically coupling the at least one electrical conductor to: (1) an external power and/or data source; and/or (2) an electronic device. Further, the electrical conductor may comprise a plurality of electrical conductors.

According to some exemplary embodiments of the present disclosure, there is described an electrical cable. Specifically, the electrical cable includes a cable portion comprising an electrical conductor positioned within an internal volume of the cable portion. Also, an electrical connecter component is positioned at a terminating end of the cable portion. Further, an internal strain relief element is positioned at a location within the internal volume of the cable portion such that: (1) a shape of the cable portion at the location of the internal strain relief is dictated by the internal strain relief; and (2) the internal strain relief element at least partially surrounds the electrical conductor, wherein the internal strain relief element comprises a cured injectable fluidic substance. Further, the internal strain relief may be positioned at a location within the internal volume of the cable portion that is other than at the terminating end of the cable portion. Also, the internal strain relief element is positioned within a pre-determined area of the location of the internal volume of the cable portion. Also, a viscosity of the injectable fluidic substance is such that, prior to its cured state and upon its injection into the internal volume, any subsequent flow of the injectable fluidic substance does not exceed the pre-determined area. In addition, the internal strain relief element comprises an epoxy.

Other aspects and advantages of the invention will be apparent from the following detailed description taken in conjunction with the accompanying drawings, which illustrate, by way of example, the principles of the described embodiments.

This summary is provided merely for purposes of summarizing some example embodiments to provide a basic understanding of some aspects of the subject matter described herein. Therefore, it will be appreciated that the above-described features are merely examples and should not be construed to narrow the scope or spirit of the subject matter described herein in any way. Other features, aspects, and advantages of the subject matter described herein will become apparent from the following detailed description, figures, and claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
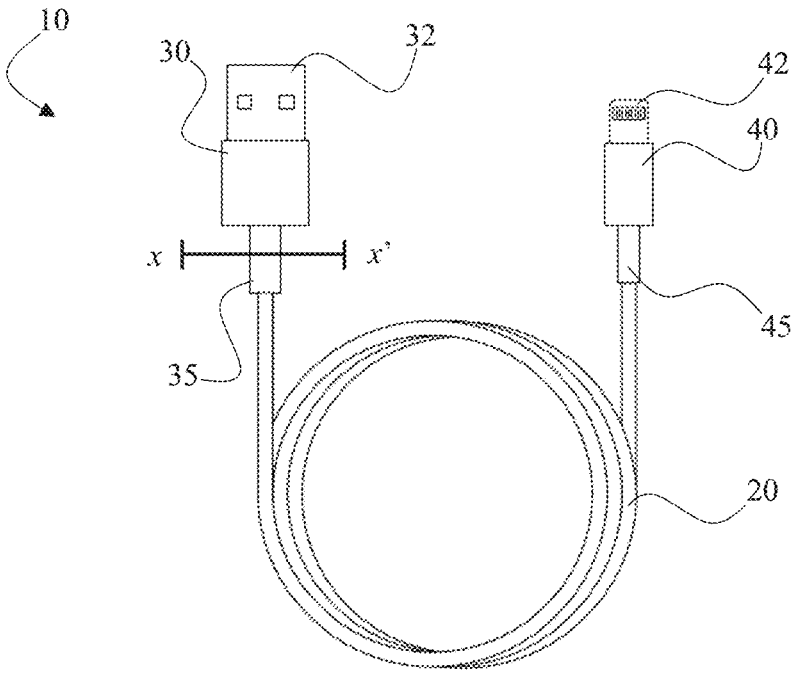
FIG. 1A is a perspective view depicting an electrical cable that has an external strain relief incorporated therein.

Reference will now be made in detail to the representative embodiments that are illustrated in the accompanying drawing figures. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the embodiments described herein. Although these embodiments are described in sufficient detail to enable one skilled in the art to practice the described embodiments, it is understood that these examples are not limiting such that other embodiments may be used, and alterations may be made, without departing from the spirit and scope of the described embodiments.

As mentioned above, this application is directed to exemplary embodiments of structural reinforcing or hardening elements that are incorporated at location(s) of an electrical cable, particularly at location(s) of an electrical cable that endure high stress or strain during routine "wear and tear" use over time. Specifically, for purposes of this disclosure, an electrical cable is defined as a sheathed bundle of multiple wires and/or strands that conduct an electrical current. Accordingly, such electrical cables may comprise multiple electrical conductors that transmit power and/or data. As non-limiting examples, electrical cables described herein may include coaxial cables, fiber optic cables, VGA cables, HDMI cables, USB Type-A cables, USB-C cables, Micro-USB cables, lightning cables, Ethernet cables, and AC power cables. The exemplary embodiments of the structural reinforcing or hardening elements, including internal strain relief elements, that are shown and described herein provide an enhanced strength and durability to electrical cables, that may be fine-tuned, customized, or adjusted based upon the specific application. In addition, as mentioned above, the structural reinforcing or hardening elements described herein may be incorporated at one or more locations of an electrical cable known to experience particularly high strain or stress. For example, the terminating ends of an electrical cable are especially susceptible to deterioration due. At each terminating end, the individual electrical conductors within the electrical cable bundle are connected (e.g., wired, soldered, etc.) to an electrical connector component that, in turn, operates to physically and electrically connect the cable to a corresponding receptacle (e.g., an outlet, I/O port, etc.) of a remote power or data source or an electronic device. Thus, due to the fact that the terminating ends constitute the points of attachment between the electrical cable and the component it is connected to, the terminating ends (including the electrical connector components) frequently endure pulling, tensioning, yanking, twisting, and pushing forces as the electrical cable is repeatedly connected and disconnected. Also, the structural reinforcing or hardening elements described herein may also be incorporated at locations of an electrical cable other than the terminating ends that may benefit from stiffening or strengthening.

Certain exemplary embodiments of structural reinforcing or hardening elements described herein may include, for example, internal strain relief elements. As are described in detail below, such internal strain relief elements may be in the form of a liquid or a fluidic substance that may be injected, or is otherwise dispensed, into one or more desired interior locations of an electronic cable. Thereafter, the liquid or fluidic substance is allowed to cure, or otherwise harden, thereby resulting in a stiffened section or region of the electronic cable. As such, the stiffened section or region fortifies or bolsters the structural strength of the electrical cable at the applied location, thus acting as an internal strain relief.

Accordingly, certain material characteristics or parameters of the liquid or fluidic substance employed effects the behavior of the liquid or fluidic substance when applied in this manner. For example, the flow rate and, therefore, the area or depth that the liquid or fluidic substance spreads to upon application may depend on the specific viscosity (as defined by the molecular structure) of the liquid or the fluidic substance. Further, the viscosity of the liquid or fluidic substance may also dictate the rate (or speed), and the methodologies, by which the substance can be cured. Thus, it stands to reason that the rate at which the liquid or fluidic substance cures, and by which method, directly affects the precision, as well as the range of options, by which the liquid or the fluidic substance is applied. Therefore, by carefully and purposefully choosing the liquid or fluidic substance that is used based upon its material characteristics and parameters, the resulting location and the manner of application of the liquid or the fluidic substance may be effectively controlled and fine-tuned to suit the specific circumstances of the application. Importantly, the type of liquid or fluidic substance, as well as the methodology and the duration of time by which the liquid or the fluidic substance is cured, may also be specifically chosen in order to arrive at the desired level or degree of stiffness or strength of the applied substance once it is cured or otherwise hardened.

Accordingly, these and other exemplary embodiments are discussed below with reference to FIGS. 3A-3B, 4A-4B, 5A-5B, 6A-6B, 7A-7C, 8, and 9. However, those that are skilled in the art will readily appreciate that the detailed description that is given herein and with respect to these figures is for explanatory purposes only and, as such, should not be construed as limiting.

Generally depicted in FIG. 1A is a perspective view of an exemplary embodiment of an electrical cable 10. As depicted, the electrical cable 10 comprises a cable portion 20 that, at each of its terminating ends, comprises an electrical connector component 30, 40. Further, each of the electrical connector components 30, 40 may also comprise a male-type connector end (32 and 42 in FIG. 1A, respectively) for insertion into, for example, a corresponding female-type receptacle (e.g., a socket, an outlet, a I/O port, etc., not shown) of a remote power and/or data source, or an electronic device, to establish electrical conduction between the electrical cable 10 and the component to which it is connected. According to this particular embodiment, the electrical cable 10 further includes an external strain relief element or component (35 and 45 in FIG. 1A, respectively) that is applied to, and surrounds, a portion of an external surface of the cable portion 20 where the junction between the cable portion 20 and each electrical connector component 30, 40 occurs. Thus, the external strain relief 35, 45 provides added rigidity and strength to the junction area of cable portion 20. In other embodiments, an external structural element, such as the external strain relief 35, 45, may additionally, or alternatively, be applied to other sections or regions of the cable portion 20 that may benefit from added structural reinforcement.

In the particular embodiment that is depicted in FIG. 1A, the electrical cable 10 comprises a USB-type cable that is capable of transmitting both power and information signals. However, the USB-type cable 10 generally pictured in FIG. 1A (and in any other subsequent figure) is one non-limiting example of the types of electrical cables applicable to the present disclosure and is depicted solely for illustrative purposes. Importantly, as mentioned above, the present disclosure is equally applicable to any type of electrical cable that may benefit from strengthening or stiffening one or more locations or regions of the electrical cable to extend its durability.

Figure 1B:
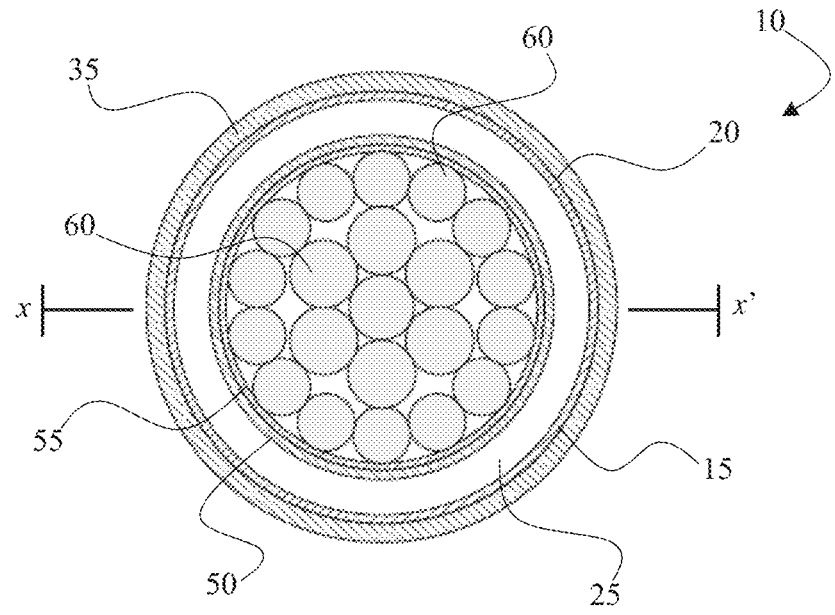
FIG. 1B is a cross-sectional view depicting the external strain relief of the electrical cable of FIG. 1A at a section indicated by line x-x'.

Referring now to FIG. 1B, there is provided a cross-sectional view of the electrical cable 10 of FIG. 1A at a section of the electrical cable 10 that is along a line x-x'. As such, the depiction in FIG. 1B provides, in greater and larger detail, a general view of an interior and composition of the electrical cable 10, according to this particular embodiment. Beginning at a central region of the interior of the cable portion 20 of the electrical cable 10, therein lies a cable bulk 55. As shown, the cable bulk 55 comprises a bundle of individual electrical (i.e., power and/or data) conductors 60. The electrical conductors 60 may be in the form of wires, cables, and/or strands, or a combination thereof. Surrounding the cable bulk 55 may be an inner sheath 50. In addition, surrounding the inner sheath 50 may be an outer sheath 15, wherein the outer sheath 15 may be separated or isolated from the inner sheath 50 by one or more insulation or dielectric layers 25. Further, at an outermost surface of the cable portion 20 is an external strain relief 35 that surrounds the outer sheath 15 of cable portion 20 at this specific section or location of cable portion 20. As shown in FIG. 1A, the external strain relief 35 has a given length and extends partially along the cable portion 20. The layers of cable portion 20 that are indicated in FIG. 1B are intended to provide a basic illustration according to one non-limiting example. In other embodiments, the cable portion 20 may comprise additional layers such as, for example, layers that are comprised of electrical shielding or armoring material(s). The cable bulk 55, as well as the several layers of cable portion 20, may be comprised of flexible or semi-flexible material(s) such that cable portion 20 is physically adaptable and willowy with respect to the environment in which it is used.

The outer sheath 15 of the cable portion 20 may be comprised of, for example, a dielectric material that is flexible or semi-flexible and provides the cable bulk 55 with suitable protection and cladding from the external environment. Further, the external strain relief 35, 45 may be comprised of the same, a similar, or different material that comprises, for example, the outer sheath 15. Examples of such materials include, but are not limited to, thermoplastic or thermoset materials such as polyvinyl chloride (PVC), polyurethane, chlorinated polyethylene (CPE), neoprene, or ethylene propylene rubber (EPR). The external strain relief 35, 45 may be applied to a desired location of cable portion 20 by, for example, a thermal-activated molding process. The specific material composition and finished dimensions (e.g., thickness and length) of the external strain relief 35, 45, may be determined according to, for example, the desired stiffness or degree of rigidity.

Although external strain relief elements or features operate to provide a degree of protection to the underlying area of an electrical cable, the external strain relief elements are, themselves, exposed to the same or similar external "wear and tear" factors that cause material degradation to the electrical cable. Further, the application of an external strain relief to an electrical cable constitutes added steps and complexity to an assembly process of the electrical cable. Additionally, external strain relief elements add bulk to the electrical cable and may be considered by users to detract from the outward (or the cosmetic) appearance of the electrical cable. Alternatively, reinforcing or hardening elements, such as strain relief elements, may be applied to an interior location of an electrical cable. Accordingly, such internal strain relief elements are housed within the interior of the electrical cable such that, while still providing a beneficial stiffness to the electrical cable, the strain relief elements are by the same token substantially protected from the external environment and hidden from view. With respect to FIGS. 2A and 2B, there is depicted one exemplary embodiment of an electrical cable having an internal strain relief element.

Figure 2A:
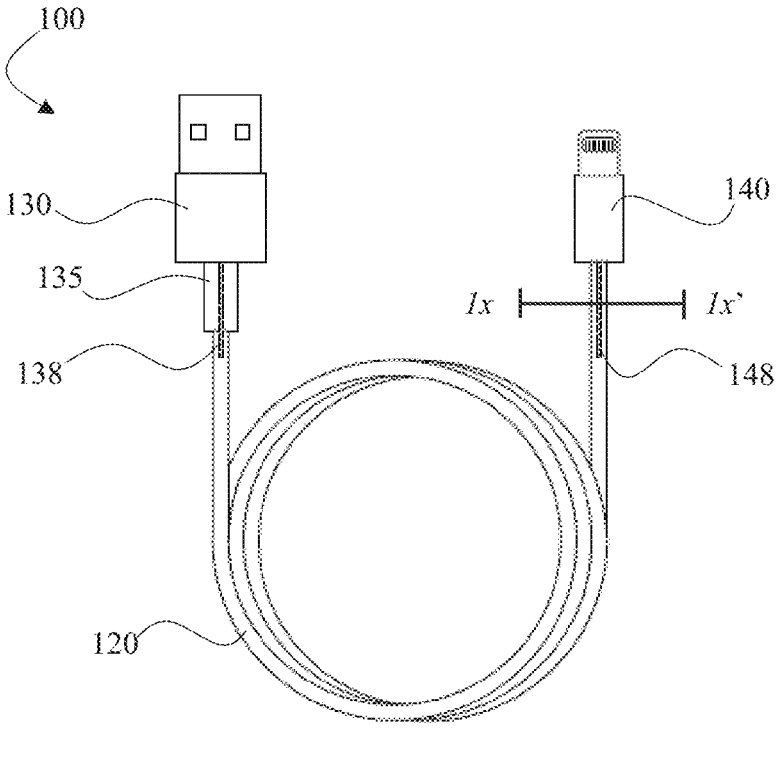
FIG. 2A is a perspective view depicting an electrical cable that has an external strain relief and an internal strain relief incorporated therein.

In FIG. 2A, there is depicted an electrical cable 100. According to this particular embodiment, electrical cable 100 is substantially similar to the electrical cable 10 depicted in FIGS. 1A and 1B. Namely, the electrical cable 100 is comprised of a cable portion 120 and, at each terminating end of cable portion 120, the electrical cable 100 has an electrical connector component 130, 140. Further, similar to the embodiment shown in FIG. 1A, an external strain relief element 135 is present at the junction area between the cable portion 120 and electrical connector component 130. However, unlike the embodiment shown in FIG. 1A, the electrical cable 100 further includes internal strain relief elements 138, 148. According to this particular embodiment, each of the internal strain relief elements 138, 148 (which are shown as dotted regions in FIG. 2A to indicate they are not visible from outside the electrical cable 100) are incorporated at an interior location of electrical cable 100 that, as illustrated, may be proximal to, or at, the junction area between cable portion 120 and the respective electrical connector component 135, 145. This interior location of the cable portion 120 of electrical cable 100 is shown in greater and larger detail in FIG. 2B, which provides a cross-sectional view of a section of the cable portion 120 of FIG. 1A that is along a line 1x-1x'.

Figure 2B:
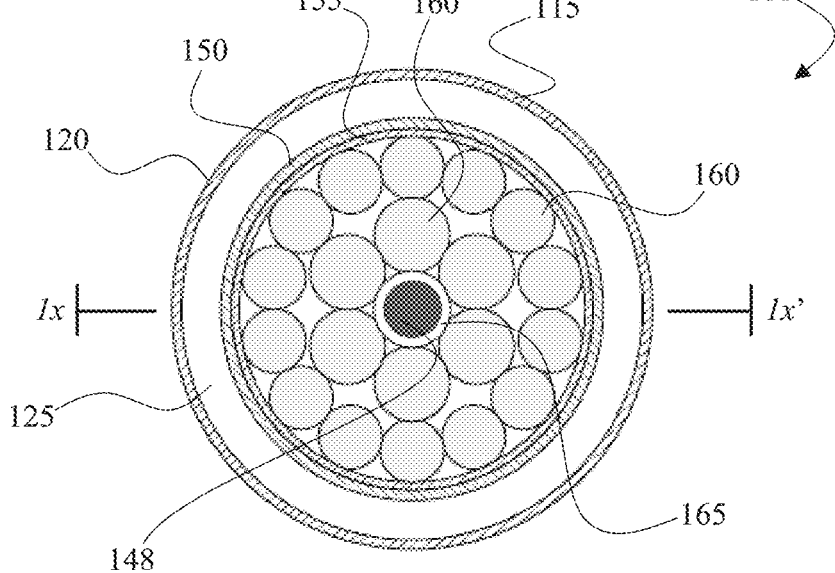
FIG. 2B is a cross-sectional view depicting the internal strain relief of the electrical cable of FIG. 2A at a section indicated by line 1x-1x'.

As indicated in FIG. 2B, in a similar manner as the electrical cable 10 of the embodiment in FIG. 1B, the cable portion 120 of the electrical cable 100 comprises, at a central region, a cable bulk 155. Accordingly, the cable bulk 155 comprises one or more individual electrical conductor(s) 160, wherein the electrical conductors 160 may be in the form of wires, cables, and/or strands, or a combination thereof. Further, cable portion 120 includes an internal sheath 150 and an external sheath 115, wherein the internal sheath 150 surrounds the cable bulk 155 and is separated or isolated from external sheath 115 by one or more insulating or dielectric layer(s) 125. Notably, unlike the embodiment depicted in FIGS. 1A and 1B, an external strain relief element is not present at this particular section of cable portion 120 according to the embodiment of FIGS. 2A and 2B. Rather, positioned within an interior opening or void 165 of cable bulk 155 of the cable portion 120 is one or more internal strain relief elements 148. The internal strain relief element 148 may be comprised of any material characterized by a suitable hardness or stiffness for providing the desired rigidity to the applied location within the cable portion 120. Therefore, internal strain relief element 148 may be comprised of a solid and/or a semi-solid material. Examples of suitable materials include, but are not limited to, a non-metal material (e.g., rubber or resin, etc.), a metal material (e.g., nickel, aluminum, or copper, etc.), a metal alloy (e.g., Nitinol or steel, etc.), or a composite thereof. Further, the internal strain relief element 148 may be of any suitable dimension as dictated by the internal features of the interior region of the cable portion to which the internal strain relief is applied, as well as the desired function of the internal strain relief within the electrical cable. For example, in the particular embodiment depicted in FIGS. 2A and 2B, the internal strain relief element 148 therein is comprised of a metal rod (e.g., a spike or spine, etc.) of suitable stiffness that has been inserted into an interior opening or a void 165 of a center region of the cable bulk 155 to a desired depth within the cable bulk 155. It should be noted that the depicted position of internal strain relief element 148 in FIGS. 2A and 2B is just one exemplary embodiment. In other embodiments, multiple internal strain relief elements may be positioned within the interior of the cable bulk. Furthermore, the internal strain relief element(s) may be positioned in various locations of the cable bulk other than, or in addition to, the center region.

As mentioned above, positioning a stiffening or hardening structural element (e.g., a strain relief element) within the interior, versus at an external surface, of an electrical cable provides the stiffening or hardening structural element with a degree of protection from the external environment and secludes the stiffening or hardening structural element from view. However, in order to accommodate the stiffening or hardening structural element within the interior of the cable bulk 155, adequate space within the interior of the cable bulk 155 must be vacated rather than being used for functional components of the cable bulk 155 (such as the electrical conductor(s) 160). Furthermore, having a relatively stiff or hard structural element within the interior of the cable bulk 155 in and amongst the various electrical conductor(s) 160 may potentially cause physical damage to the electrical conductor(s), as well as to the several layers of the cable portion, over time as the electrical cable is frequently handled and rigorously manipulated.

Based on, for example, the considerations discussed above regarding the general concepts of applying a strain relief element externally and/or internally to a cable portion of an electrical cable (as illustrated by the exemplary embodiments depicted in FIGS. 1A-1B and 2A-2B), reference is now made to the exemplary embodiment shown in FIGS. 3A and 3B and the general concepts described in connection therewith. Beginning at FIG. 3A, there is depicted an exemplary embodiment of an electrical cable 200. Similarly to the exemplary embodiments illustrated in FIGS. 1A-1B and 2A-2B, the electrical cable 200 comprises a cable portion 220, wherein at each terminating end of the cable portion 220 is a respective electrical connector component 230, 240 for physically and electrically coupling the electrical cable 200 to, for example, a remote power and/or data source or an electronic device. In addition, applied at, for example, an interior of the cable portion 220 at the junction area between the cable portion 220 and each of electrical connector components 230, 240 is a respective stiffening or hardening structural element 238, 248 (which are shown as dotted regions in FIG. 3A to indicate that they are not visible from outside the electrical cable 200). Further, according to this particular embodiment, the stiffening or hardening structural element 238, 248 may operate as an internal strain relief.

Figure 3A:
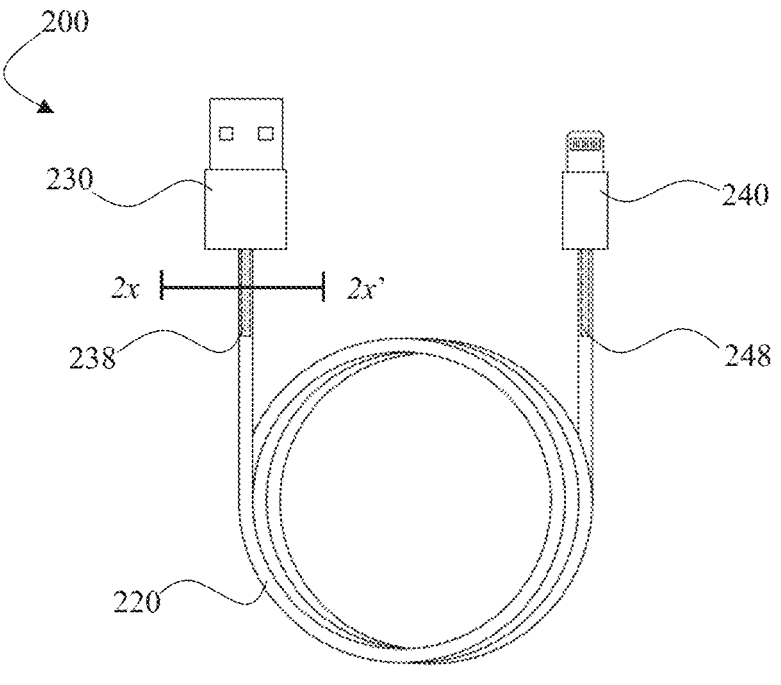
FIG. 3A is a perspective view depicting an electrical cable that has an injected internal strain relief incorporated therein according to an exemplary embodiment.
Figure 3B:
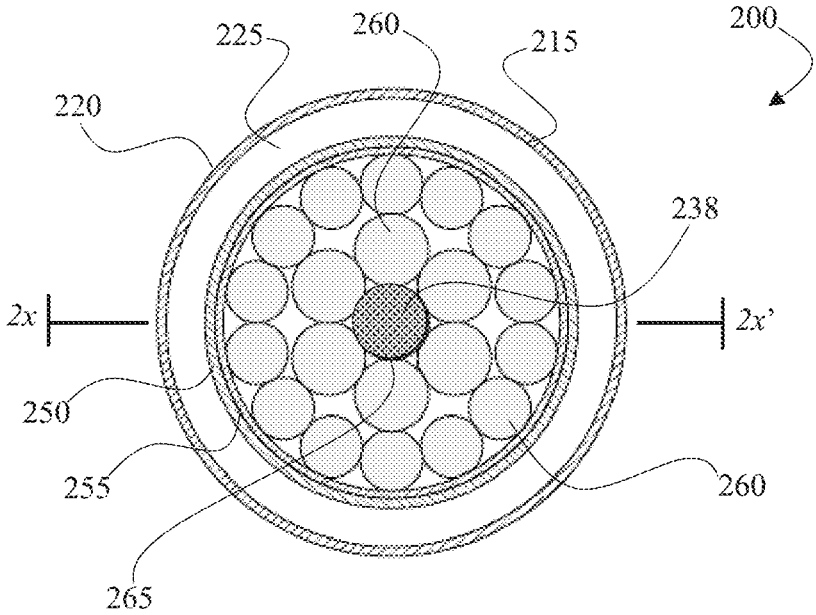
FIG. 3B is a cross-sectional view depicting the injected internal strain relief of the electrical cable of FIG. 3A at a section indicated by line 2x-2x'.

Turning now to FIG. 3B, there is shown a cross-sectional view of a section of cable portion 220 of the electrical cable 200 of the exemplary embodiment that is depicted in FIG. 3A, along a line 2x-2x'. As illustrated, at a center region of cable portion 220 is a cable bulk 255, wherein the cable bulk 255 surrounds and encompasses one or more individual electrical conductor(s) 260. The electrical conductors 260 may be in the form of wires, cables, and/or strands, or a combination thereof. Proceeding outward from the cable bulk 255 is an internal sheath 250. Further, cable portion 220 comprises an outer sheath 215 that surrounds the inner sheath 250, wherein the inner sheath 250 is isolated or is separated from the outer sheath 215 by one or more insulating or dielectric layer(s) 225.

As is also depicted in FIG. 3B, a stiffening or hardening structural element 238 is disposed within a tube or column 265 of the cable bulk 255. According to this particular embodiment, the stiffening or hardening structural element 238 comprises a liquid or fluidic substance that, while in its liquid or fluidic state, is disposed within tube or column 265 and is subsequently cured (or otherwise hardened) in order to stiffen the substance to a desired rigidity and to set the substance in place. As such, the liquid or fluidic substance used herein may be comprised of any suitable liquid or fluidic substance that is characterized by a viscosity that permits the substance to be controllably administered (or dispensed) to a desired depth of an interior location of a cable bulk and, thereafter, can be cured or otherwise hardened within the cable bulk itself. Examples of such liquid or fluidic substances include, but are not limited to, various epoxy resins or glues, acrylics, polyurethanes, silicone resins or composites, rubber cements, and polyvinyl acetates, etc. According to some embodiments, in order for the liquid or fluidic substance to be disposed within the interior of the cable bulk in a precise and controlled manner, the liquid or fluidic substance may be characterized by a viscosity that substantially prevents the substance from continuing to travel or to spread (as a result of, for example, the force of gravity) beyond the point or the area of application. Alternatively, according to certain other embodiments, the method of curing or hardening the liquid or fluidic substance, as well as how quickly a curing or hardening agent is applied (or imparted) to the substance subsequent to its application, may also be specifically determined or chosen in order to carefully control the movement and the flow of the liquid or fluidic substance, particularly in instances in which the substance has a relatively low viscosity.

Various curing or hardening agents may be applied to an electrical cable in order to harden or to otherwise set an applied liquid or fluidic substance into a resulting solid, or semi-solid, state within the interior of the electrical cable. The specific type of curing or hardening agent that is applied in a given circumstance may depend upon the type of substance that is to be cured and the desired degree of rigidity. Examples of suitable curing or hardening agents may include, but are not limited to, ambient air, a chemical hardener additive, a supplemental heat source, and ultraviolet light, etc.

By utilizing, for the stiffening or hardening structural element, a substance that is initially in a liquid or fluidic state when incorporated into the interior of the cable bulk, the incorporation and presence of the liquid or fluidic substance causes relatively little to no disturbance to the surrounding or the adjacent electrical conductors that are also present in the interior of the cable bulk. In addition, as described in greater detail below, a liquid or fluidic substance is malleable and, therefore, can uniquely mold to and take on the interior shape of the space to which it is applied. Thus, the liquid or fluidic substance seeps into and fills any open space within its path. Further, any structure that comes into contact with the liquid or fluidic substance is effectively set and stabilized by the substance when the substance is cured or hardened. Furthermore, due to the significant range of liquid or fluidic substances that may be utilized for this purpose, wherein each substance has a different chemical structure and certain material characteristics, the rigidity and the dimensions of the resulting stiffening or hardening structural element may be fine-tuned and customized to suit the specific application.

Figure 4A:
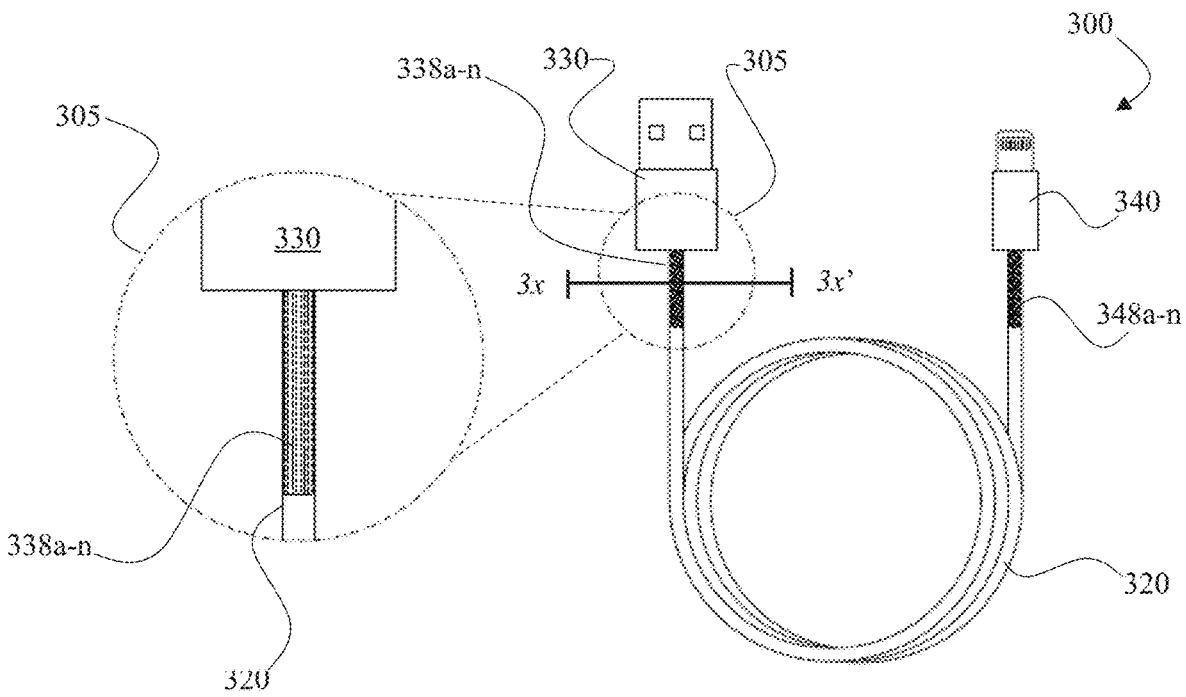
FIG. 4A is a perspective view depicting an electrical cable that has an injected internal strain relief incorporated therein according to another exemplary embodiment.
Figure 4B:
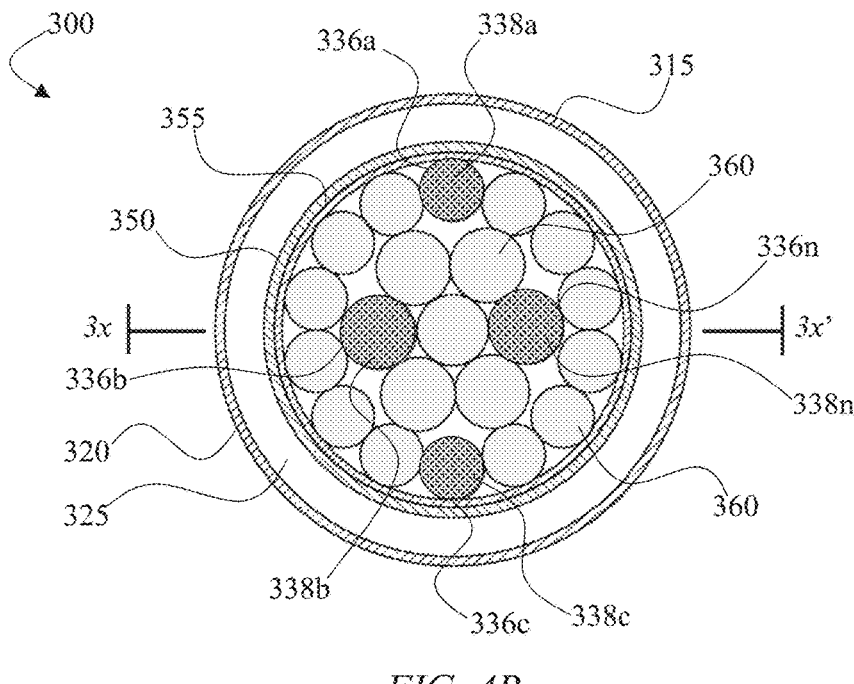
FIG. 4B is a cross-sectional view depicting the injected internal strain relief of the electrical cable of FIG. 4A at a section indicated by line 3x-3x'.

Further, although the exemplary embodiment of the electrical cable 200 depicted in FIGS. 3A and 3B provides that the liquid or fluidic substance forms a stiffening or hardening structural element 238 at a central region (i.e., within a tube or column 265) of cable bulk 255, such a location is only a non-limiting example. According to the present disclosure, the liquid or fluidic substance may be applied to one or more other locations within the interior of the cable bulk of an electronic cable. For example, depicted in FIGS. 4A and 4B is an exemplary embodiment of an electrical cable 300 in which a liquid or fluidic substance is applied to an interior of the electrical cable 300 at multiple locations. In FIG. 4A, there is provided a perspective view of the electrical cable 300, wherein the electrical cable 300 comprises a cable portion 320 and a respective electrical connector component 330, 340 that is positioned at each terminating end of electrical cable 300. Further, a respective stiffening or hardening structural element 338a-n, 348a-n is present at a junction area between each of the electrical connector components 330, 340 and cable portion 320. As shown in greater detail in the enlarged view of region 305 of electrical cable 300, stiffening or hardening structural elements 338a-n, 348a-n, (wherein "n" is an integer greater than zero) comprise multiple stiffening or hardening structural elements.

Referring now to FIG. 4B, there is depicted a cross-sectional view of a section of the electrical cable 300 of the exemplary embodiment of FIG. 4A, along a line 3x-3x'. As shown, at a center region of cable portion 320 of electrical cable 300 is a cable bulk 355, wherein the cable bulk 355 comprises one or more individual electrical conductor(s) 360. As previously mentioned, electrical conductors 360 may be in the form of wires, cables, and/or strands, or a combination thereof. Additionally, surrounding the cable bulk 355 is an inner sheath 350. In addition, an outer sheath 315 surrounds the inner sheath 350, wherein the outer sheath 315 is isolated or separated from inner sheath 350 by one or more insulating or dielectric layer(s) 325. Referring back to the cable bulk 355, there is also shown, amongst the one or more electrical conductors 360, several bounded openings (e.g., tubes or columns 336a, 336b, 336c, and 336n, wherein "n" is an integer greater than zero) in which a liquid or fluidic substance has been incorporated and cured (or otherwise hardened) to form the respective stiffening or hardening structural elements 338a, 338b, 338c, and 338n.

Figure 5A:
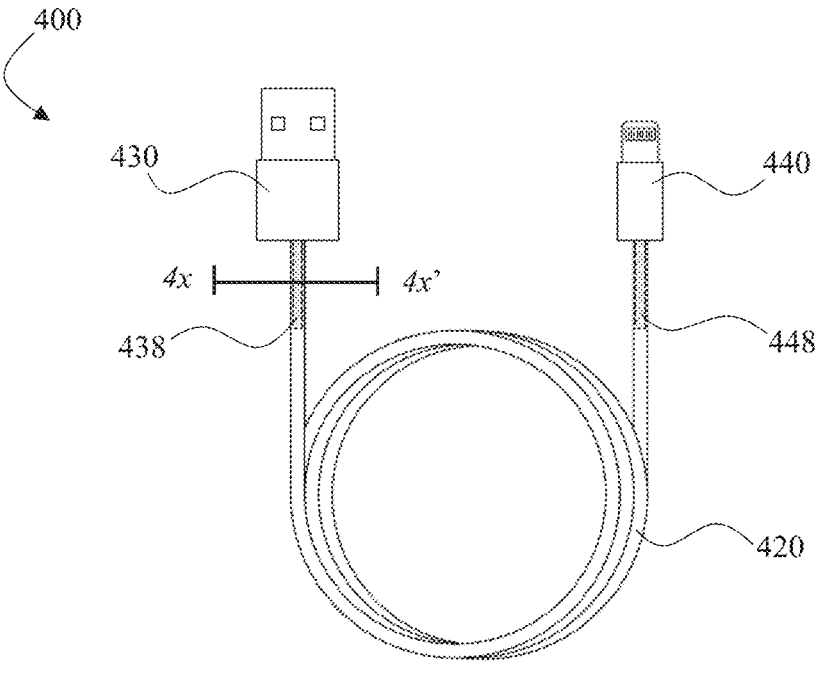
FIG. 5A is a perspective view depicting an electrical cable that has an injected internal strain relief incorporated therein according to a further exemplary embodiment.
Figure 5B:
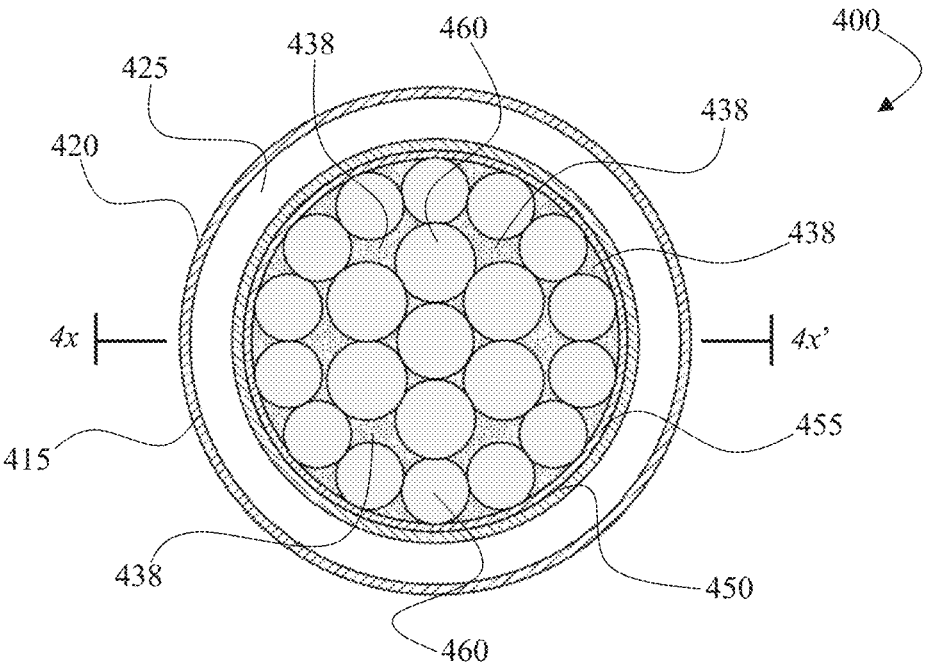
FIG. 5B is a cross-sectional view depicting the injected internal strain relief of the electrical cable of FIG. 5A at a section indicated by line 4x-4x'.

With respect to FIGS. 5A and 5B, there is illustrated therein a further exemplary embodiment of an electrical cable 400. As shown in the perspective view provided in FIG. 5A, the electrical cable 400 comprises a cable portion 420 and, at each terminating end of the cable portion 420, is a respective electrical connector component 430, 440. Further indicated in FIG. 5A are stiffening or hardening structural elements 438, 448 disposed within an interior of cable portion 420 at a junction area that occurs between each of the electrical connector components 430, 440 and the cable portion 420. It should be noted that the stiffening or hardening structural elements 438, 448 are shown in FIG. 4A as dotted regions in order to indicate that they are not visible from outside the electrical cable 400. According to this particular embodiment, the stiffening or hardening structural elements 438, 448 operate or function to provide an internal strain relief to the cable portion 420.

Turning now to FIG. 5B, there is depicted a cross-sectional view of a section of the cable portion 420 of the electrical cable 400 of the exemplary embodiment of FIG. 5A, along a line 4x-4x'. As indicated, at a center region of the cable portion 420 is a cable bulk 455. The cable bulk 455 comprises one or more individual electrical conductor(s) 460, wherein the individual electrical conductor(s) 460 may be in the form of wires, cables, and/or strands, or a combination thereof. In addition, surrounding cable bulk 455 is an inner sheath 450. Further, surrounding the inner sheath 450 is an outer sheath 415, wherein the outer sheath 415 is isolated and separated from inner sheath 450 by one or more insulating or dielectric layer(s) 425. According to this particular embodiment, the stiffening or hardening structural element 438 comprises a liquid or fluidic substance that, while in its liquid or fluidic substance, is forcibly disposed within the interior of the cable bulk 455, such that the liquid or fluidic substance seeps into any open spaces or open voids that exist between the one or more individual electrical conductor(s) 460. Therefore, in contrast to the embodiments depicted in FIGS. 2A-2B and 3A-3B, the liquid or fluidic substance is permitted to flow in-between the individual electrical conductor(s) 460, such that the substance floods the area of application within the cable bulk interior and is not bounded or confined within one or more specific locations. Subsequently, a curing or hardening agent is applied to electrical cable 400 in order to change the state of the substance into a solid state or semi-solid state, thereby providing a degree of rigidity to the electrical cable 400.

It should be noted that, by permitting the liquid or fluidic substance to sink into and surround the individual electrical conductor(s) 460, the substance, when cured or hardened, beneficially sets the individual electrical conductor(s) 460 in place in addition to providing the strengthening rigidity to electrical cable 400. As a result, the individual electrical conductor(s) 460 are girded in place, thereby preventing the electrical conductor(s) from any undesirable movement within the cable bulk 455. Accordingly, the physical and electrical connections occurring at the terminal ends of the cable portion 420 are further stabilized and secured by application of the liquid or fluidic substance.

Figure 6A:
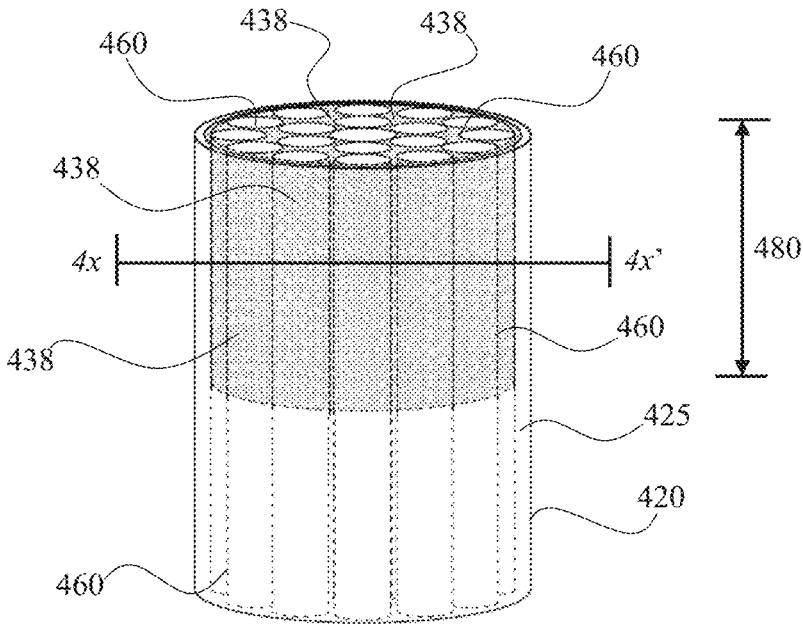
FIG. 6A is an isometric view depicting the internal strain relief of the electrical cable of FIG. 5A, in which the internal strain relief is incorporated into the electrical cable using an injection process.
Figure 6B:
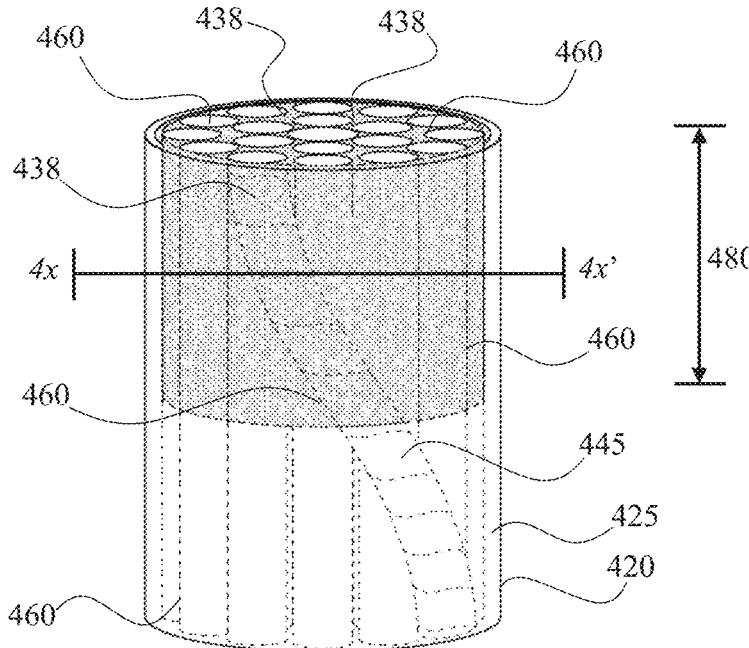
FIG. 6B is an isometric view depicting the internal strain relief of the electrical cable of FIG. 5A, in which the internal strain relief is at least partially incorporated into the electrical cable by a wicking process.

Referring now to FIG. 6A, there is depicted a side view of the section of the cable portion 420 described with respect to FIG. 5B. As shown, the liquid or fluidic substance is dispensed and subsequently cured or hardened such that it forms a stiffening or hardening structural element 238 to a desired depth 480 within the interior of the cable portion 420. As described in detail below, the liquid or fluidic substance may be dispensed or injected into the cable portion 420 with variable degrees of force. The specific type of dispenser or injector mechanism or component that is used, as well as the amount of force or pressure that is applied while dispensing or injecting the liquid or fluidic substance, may depend on several physical factors. Such factors may include, but are not limited to, the diameter of the cable portion, the volume of the available open spaces or voids within the interior of the cable portion, and the specific viscosity of the liquid or fluid substance applied, etc. Further, FIG. 6B demonstrates an additional physical factor that may be considered. In the particular embodiment shown in FIG. 6B, one or more of the individual electrical conductor (s) 460 within cable portion 420 has a textured external surface 445. For example, an electrical conductor 460 may be comprised of a fiber optic cable, or a bundle of twisted or braided wires, such that the external surface of the electrical conductor 460 is textured. Due to the textured external surface of such an electrical conductor 460, the electrical conductor 460 acts to naturally, or inherently, wick the liquid or fluidic substance down into the interior of the cable portion 420. In such an instance, relatively less force may be required in order to dispense the liquid or fluidic substance.

Figure 7A:
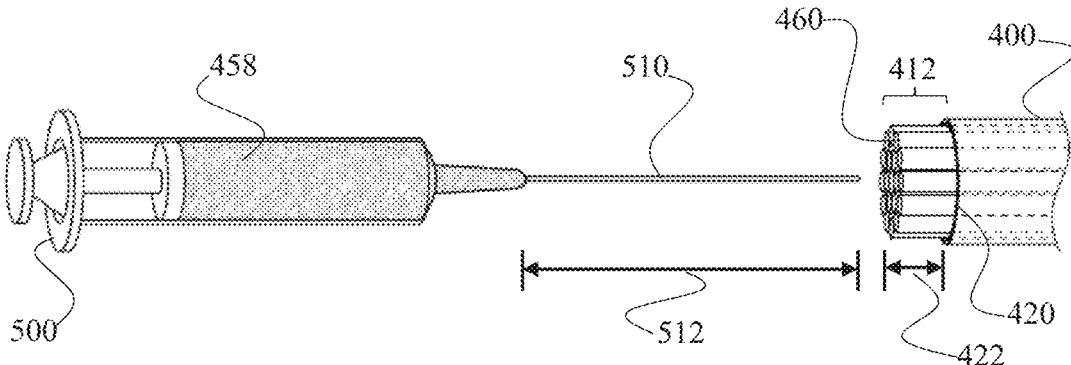
FIG. 7A is a perspective view depicting an exemplary embodiment of an injection device as used in an injection process for incorporating an internal strain relief into the electrical cable of FIG. 5A.
Figure 7B:
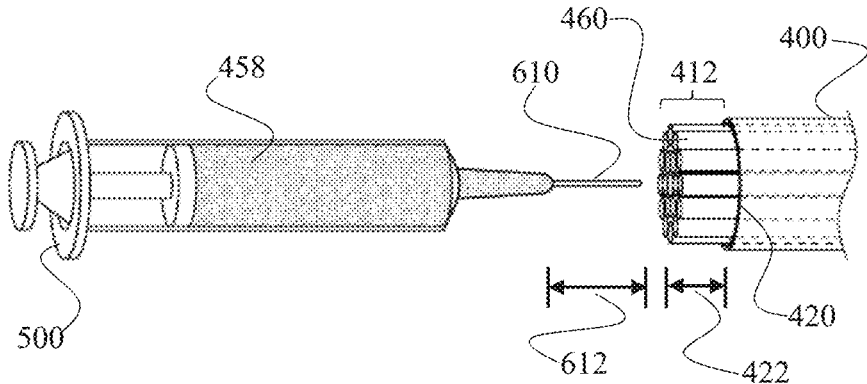
FIG. 7B is a perspective view depicting another exemplary embodiment of an injection device as used in an injection process for incorporating an internal strain relief into the electrical cable of FIG. 5A.
Figure 7C:
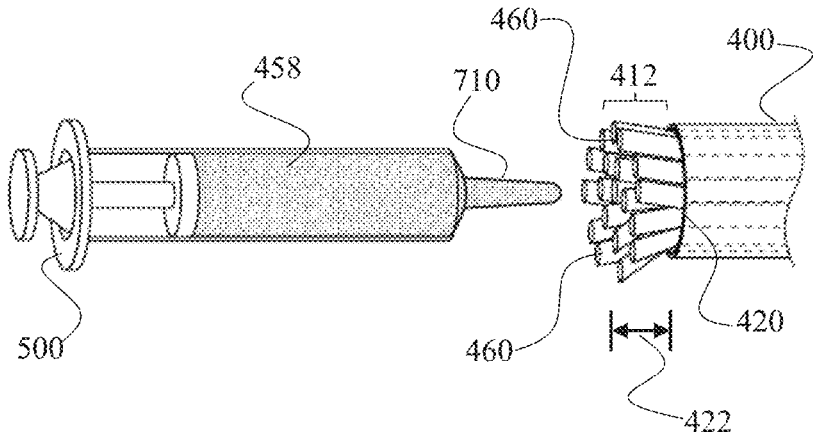
FIG. 7C is a perspective view depicting a further exemplary embodiment of an injection device as used in an injection process for incorporating an internal strain relief into the electrical cable of FIG. 5A.

Referring now to FIGS. 7A-7C, there is shown several exemplary embodiments of a dispenser or an injection device or component 500 that may be used to dispense or to forcibly inject a liquid or fluidic substance into one or more interior locations of a cable portion 420, as described above with respect to the electrical cable embodiments depicted in FIGS. 3A-3B, 4A-4B, 5A-5B, and 6A-6B. Beginning at FIG. 7A, there is depicted a dispenser or injection device 500 that comprises a needle (or tube) 510 having a given length 512. In this depiction, the dispenser or injection device 500 contains a volume of an injectable liquid or fluidic substance 458. Thus, according to this particular embodiment, the liquid or fluidic substance 458 may be forcibly injected within a cable portion 420 to at least a depth equal to the length 512 of needle 510. Continuing onward to FIG. 7B, there is shown the same dispenser or injection device 500 shown in FIG. 7A, but with the exception that the device 500 comprises a needle (or tube) 610 having a given length 612 that is relatively shorter than the length 512 of the needle 510 that is employed in the embodiment of FIG. 7A. As a result, the dispenser or injection device 500 according to the embodiment of FIG. 7B can only dispense or forcibly inject a liquid or fluidic substance 458 within the cable portion 420 from a depth that is comparatively closer to the terminating end of the cable portion 420 when compared to the embodiment of FIG. 7A. By shortening the needle 610, the needle does not need to traverse as deeply into the interior of the cable portion 420 as needle 510 of the embodiment of FIG. 7A. As a result, the process of dispensing or injecting the liquid or fluidic substance 458 is simplified and the needle 610 is addition-ally protected from any damage to it that may occur from traveling down into the cable portion interior. However, an increase in the magnitude of the dispensing or injecting force is necessary in order to push the liquid or fluidic substance 458 to the same depth within the cable portion 420 that is possible using the device of the embodiment of FIG. 7A. Referring now to FIG. 7C, depicted therein is, again, the same dispenser or injection device 500 depicted in the embodiment in FIG. 7A. However, according to this par-ticular embodiment, the dispenser or injection device 500 does not comprise a needle. Rather, the liquid or fluidic substance 458 is dispensed out from a dispenser component 710. As illustrated in FIG. 7C, a diameter of the dispenser component 710 is relatively wider when compared to the respective diameters of the needles 510 and 610 of the embodiments in FIGS. 7A and 7B. In other words, the dispenser component 710 has a relatively blunt application tip. Accordingly, while the liquid or fluidic substance 458 may easily flow outward from the device 500 and the dispenser component 710 is less intrusive with respect to the interior of cable portion 420, a significant amount of manual pressure is required in order to force the liquid or fluidic substance 458 to a desired depth within the interior of the cable portion 420. Further, it may be necessary to splay the electrical conductor(s) 460 apart at the terminating end of the cable portion 420 in order for the dispenser component 710 to access the interior of the cable portion 420.

Figure 8:
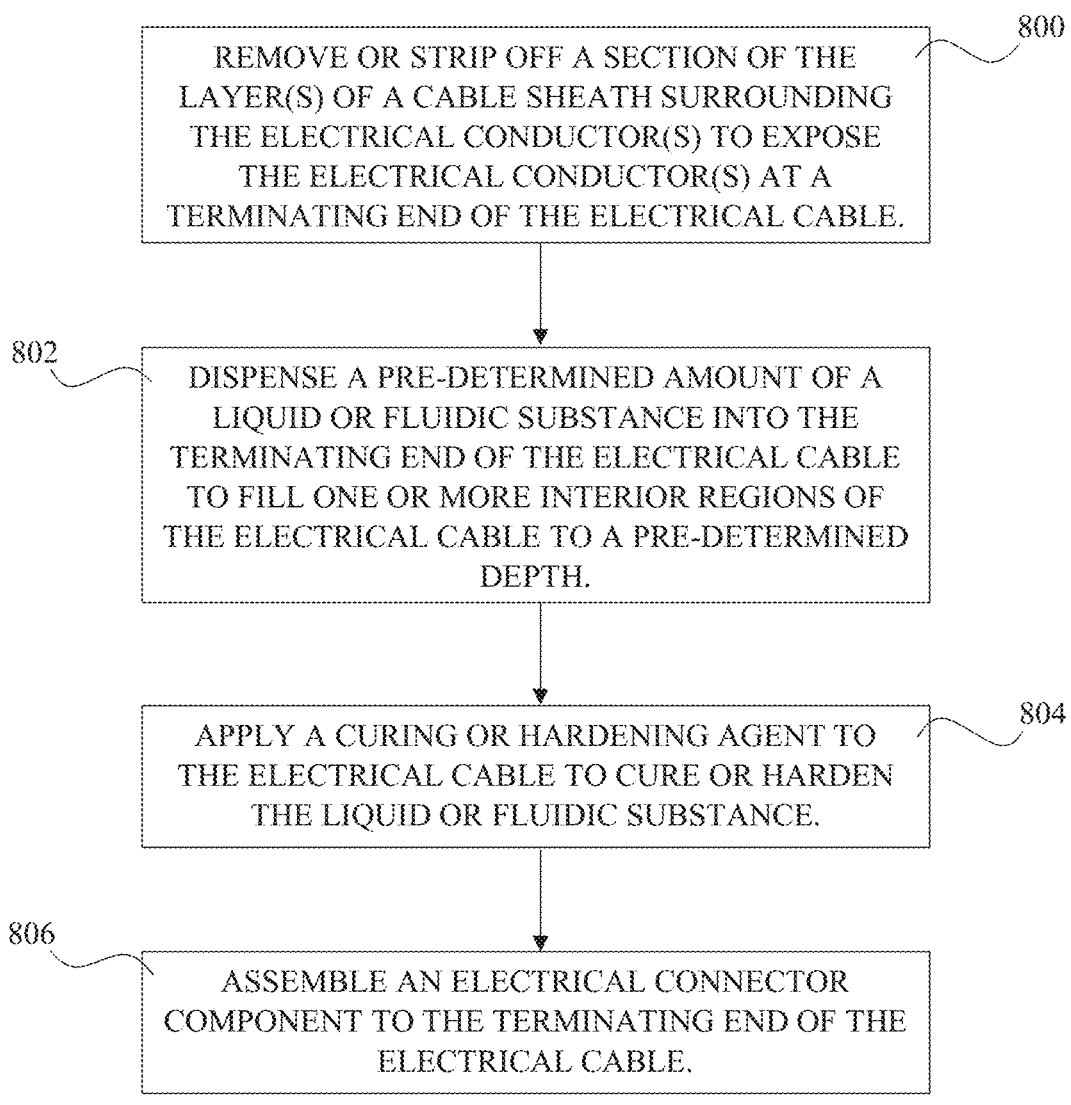
FIG. 8 is a flow diagram generally depicting several steps of an assembly process for incorporating into an electrical cable an internal strain relief according to an exemplary embodiment.

With respect to FIG. 8, depicted therein is a flow diagram that, in general terms, outlines several steps of an exemplary embodiment of an assembly process for incorporating an injected internal strain relief within a terminating end of an electrical cable. Accordingly, beginning at step 800, in order to gain sufficient access to an interior of the electrical cable, a section of the layer(s) of a cable sheath surrounding the electrical conductor(s) of the electrical cable is removed or stripped off in order to expose the electrical conductor(s) at the terminating end of the electrical cable. (A depiction of this removal of, for example, the outer sheath of the elec-trical cable is shown in FIGS. 7A-7C, wherein a given length 422 of a terminating section 412 of the outer sheath is absent, thereby exposing electrical conductor(s) 460.) Next, at step 802, a pre-determined amount of a liquid or fluidic substance is then dispensed into the terminating end of the electrical cable, thereby filling in one or more interior regions of the electrical cable and to a pre-determined depth within the electrical cable. Further, at step 804, a curing or hardening agent is applied to the electrical cable in order to cure or harden the dispensed liquid or fluidic substance to a desired rigidity. Lastly, at step 806, an electrical connector component is assembled to the terminating end of the electrical cable.

Figure 9:
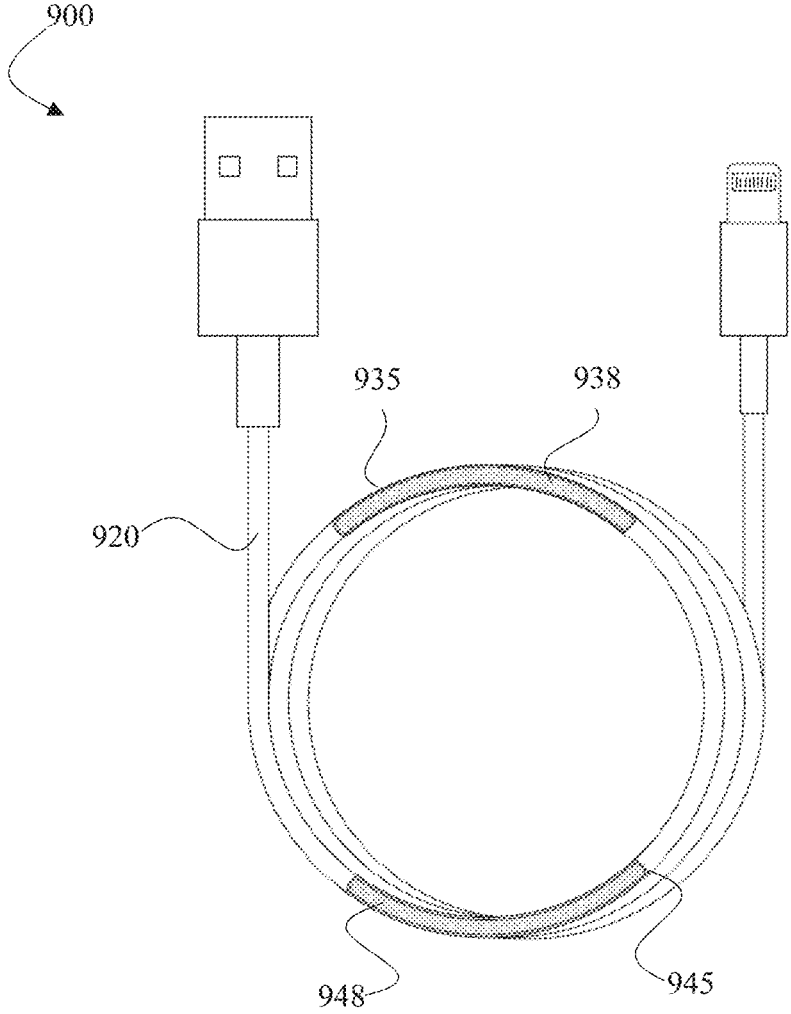
FIG. 9 is a perspective view depicting an electrical cable that has an injected internal strain relief incorporated at multiple locations therein.

Additionally, in each of the exemplary embodiments that are described and depicted above, at focus is the incorpo-ration of a stiffening or hardening structural element at the terminating ends of the respective electrical cable and, in particular, the junction area between a cable portion and an electrical connector component. However, as also men-tioned above, a stiffening or hardening structural element may be incorporated into any interior region of an electrical cable that may benefit from a strengthening or a stiffening of the electrical cable. For example, referring now to FIG. 9, depicted therein is an exemplary embodiment of an electri-cal cable 900 in which a stiffening or hardening structural element 938, 948 is applied to an internal location (i.e., locations 935 and 945, respectively) of the cable portion 920 of the electrical cable 900 other than at the terminating ends of the electrical cable. In addition to improving the durabil-ity of the electrical cable, the stiffening or hardening struc-tural element(s) may be used, for example, to induce an inherent bend or other shape within the electrical cable, or to dictate a specific direction of the electrical cable.

The foregoing description, for purposes of explanation, used specific nomenclature to provide a thorough under-standing of the described embodiments. However, it will be apparent to one skilled in the art that the specific details are not required in order to practice the described embodiments. Thus, the foregoing descriptions of specific embodiments are presented for purposes of illustration and description.

They are not intended to be exhaustive or to limit the described embodiments to the precise forms disclosed. It will be apparent to one of ordinary skill in the art that many modifications and variations are possible in view of the above teachings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electrical cable, comprising:
a cable portion comprising an electrical conductor that is positioned within an internal volume of the cable portion;
a hollow tube that is positioned within the internal volume of the cable portion, wherein the hollow tube is adjacent the electrical conductor;
an electrical connector component that is positioned at a terminating end of the cable portion; and
an internal strain relief element that is positioned within the hollow tube, wherein the internal strain relief element comprises a cured injectable fluidic substance.

2. The electrical cable according to claim 1, wherein a viscosity of the cured injectable fluidic substance is such that, in its cured state, the injectable fluidic substance has a pre-determined degree of rigidity.

3. The electrical cable according to claim 1, wherein the electrical connector component is capable of electrically coupling the electrical conductor to an external power and/or data source.

4. The electrical cable according to claim 1, wherein the electrical connector component is capable of electrically coupling the electrical conductor to an external electronic device.

5. The electrical cable according to claim 1, wherein the internal strain relief element comprises an epoxy.

6. The electrical cable according to claim 1, wherein:
the hollow tube comprises a plurality of hollow tubes that are positioned within the internal volume of the cable portion; and
the internal strain relief element is positioned within each of the hollow tubes.

7. The electrical cable according to claim 1, wherein the internal strain relief element is positioned within the hollow tube: (1) at the terminating end; and (2) to a pre-determined depth within the hollow tube.

8. The electrical cable according to claim 7, wherein a viscosity of the injectable fluidic substance is such that, prior to its cured state and upon its injection into the hollow tube, any subsequent flow of the cured injectable fluidic substance does not exceed the pre-determined depth.

9. An electrical cable, comprising:
a cable portion comprising a plurality of electrical conductors that are positioned within an internal volume of the cable portion;
an electrical connector component that is positioned at a terminating end of the cable portion; and
a hollow tube that is positioned within the internal volume of the cable portion, wherein the hollow tube is adjacent the plurality of electrical conductors; and
a plurality of internal strain relief elements separated by the plurality of electrical conductors and positioned within the internal volume of the cable portion such that the plurality of internal strain relief elements surround at least a portion of the plurality of electrical conductors, wherein the plurality of internal strain relief elements comprise a cured injectable fluidic substance.

10. The electrical cable according to claim 9, wherein a viscosity of the cured injectable fluidic substance is such that, in its cured state, the injectable fluidic substance has a pre-determined degree of rigidity.

11. The electrical cable according to claim 9, wherein the electrical connector component is capable of electrically coupling the plurality of electrical conductors to an external power and/or data source.

12. The electrical cable according to claim 9, wherein the electrical connector component is capable of electrically coupling the plurality of electrical conductors to an external electronic device.

13. The electrical cable according to claim 9, wherein the plurality of internal strain relief elements are positioned between the plurality of electrical conductors.

14. The electrical cable according to claim 9, wherein the plurality of internal strain relief elements are positioned within the internal volume: (1) at the terminating end of the cable portion; and (2) to a pre-determined depth within the internal volume.

15. The electrical cable according to claim 14, wherein a viscosity of the cured injectable fluidic substance is such that, prior to its cured state and upon its injection into the internal volume, any subsequent flow of the injectable fluidic substance does not exceed the pre-determined depth.

16. An electrical cable, comprising:
a cable portion comprising a cable bulk surrounding a plurality of electrical conductors positioned within an internal volume of the cable portion, the cable bulk defining a central region;
an electrical connector component that is positioned at a terminating end of the cable portion;
a hollow tube that is positioned within the internal volume of the cable portion, wherein the hollow tube is adjacent the plurality of electrical conductors; and
an internal strain relief element that is positioned at the central region and between the plurality of electrical conductors, wherein:
a shape of the cable portion is dictated by the internal strain relief element; and
the internal strain relief element comprises a cured injectable fluidic substance.

17. The electrical cable according to claim 16, wherein the internal strain relief element is positioned in the hollow tube.

18. The electrical cable according to claim 16, wherein the internal strain relief element comprises an epoxy.

19. The electrical cable according to claim 16, wherein the internal strain relief element is positioned within a pre-determined area of the internal volume of the cable portion.

20. The electrical cable according to claim 19, wherein a viscosity of the cured injectable fluidic substance is such that, prior to its cured state and upon its injection into the internal volume, any subsequent flow of the injectable fluidic substance does not exceed the pre-determined area.

* * * * *